Nov. 12, 1935.  C. ORR  2,021,085

COMPRESSOR VALVE

Filed Sept. 12, 1933

Inventor:
Clark Orr,
by Harry E. Dunham
His Attorney.

Patented Nov. 12, 1935

2,021,085

UNITED STATES PATENT OFFICE 2,021,085

COMPRESSOR VALVE

Clark Orr, Fort Wayne, Ind., assignor to General Electric Company, a corporation of New York Application September 12, 1933, Serial No. 689,089

1 Claim. (Cl. 251—119)

My invention relates to compressor valves.

It is an object of my invention to provide a valve for compressors which shall be of simple construction and effective in operation.

Further objects and advantages of my invention will become apparent as the following description proceeds, and the features of novelty which characterize my invention will be pointed out with particularity in the claim annexed to and forming a part of this specification.

Figure 1:
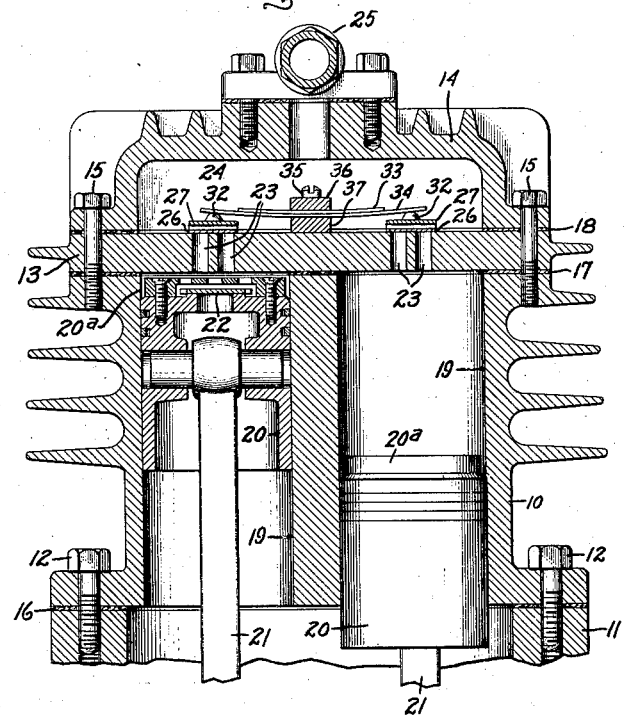
Figure 2:
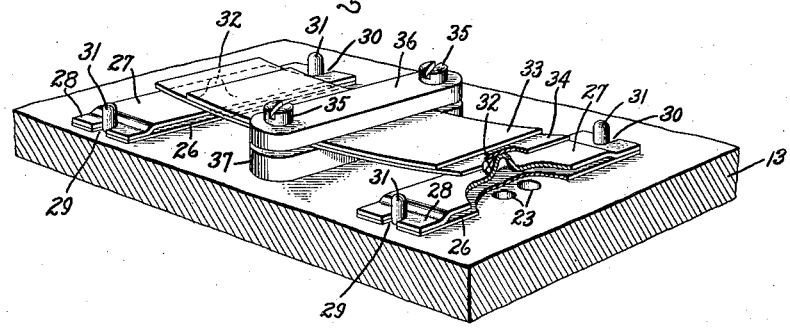

For a better understanding of my invention reference may be had to the accompanying drawing in which Fig. 1 is a sectional elevation of a compressor having a valve embodying my invention, and Fig. 2 is a perspective view partly in section of the valve and valve plate shown in Fig. 1.

Referring now to the drawing, in Fig. 1 I have shown a portion of a compressor comprising a cylinder block 10 secured to a crank case 11 by bolts 12 and having a plate 13 or the like and a cylinder head 14 secured to the upper end thereof by bolts 15, suitable gaskets 16, 17, and 18 being provided to seal the joints between the crank case, the cylinder, the valve plate, and the cylinder head. The cylinder block 10 is provided with two cylinders 19 having pistons 20 fitted therein which are reciprocated in the cylinders by cranks and connecting rods 21 to compress the gas. Gas is admitted to the cylinders 19 through intake valves 22 arranged in the heads 20a of the pistons 20. Gas compressed in the cylinders 19 is discharged therefrom to the chamber 24 in the cylinder head through a plurality of ports 23 in the plate 13 and below the valves, and the gas is discharged from the chamber 24 through a connection 25.

In accordance with my invention, I provide an improved discharge valve for preventing the return of compressed gas from the chamber 24 to the cylinders. This valve is so constructed that under normal operating conditions it will readily pass all the gas discharged by the compressor, and it is also arranged so that in the event of excessive pressure of compressed gas or liquid, such as oil, which may enter the cylinder, it will open farther to permit the passage of such gas or liquid.

A separate valve assembly is arranged over the ports 23 of each cylinder. Each valve assembly includes an elongated flat flexible valve 26 made of spring steel or the like, which is seated on the plate 13 over the ports 23 of one cylinder, and a rigid bridging member 27 having flat portions 28 at either end bearing on the ends of the valve 26, the intermediate portion of the bridging member being arranged to limit the flexure of the valve in its normal opening movement. The valve 26 and the bridging member 27 are provided with elongated recesses or slots 29 and 30 respectively in both ends, and the valve assembly is retained in position over the ports 23 by pins 31 which are rigidly secured in the plate 13 and pass through the slots in the bridging member and valve. The pins 31 also guide the valve and bridging member in their outward movement under abnormal conditions. It will be understood that the plate 13 may be made integral with the cylinders 19, and that my improved valve may be utilized by providing a suitable seat for the valves about the ports to be controlled thereby. The bridging member 27 is formed with an upwardly extending projection 32 in the center thereof against which bears a spring comprising upper and lower leaves 33 and 34 which retains the bridging member 27 securely against the valve 26, thereby resiliently maintaining the valve seated over the ports 23. The springs 33 and 34 are secured to the plate 13 by screws 35 between upper and lower clamping bars 36 and 37. This method of assembling the springs and valves makes possible ready removal of all the valve parts when it is desired to clean or inspect the same, and at the same time provides a reliable and easily adjustable assembly. Springs 33 and 34 extend equally on either side of the bars and bear against the valve assembly at either end over the two cylinders of the compressor. During the operation of the compressor, the gas discharged through the ports 23 under normal operation deflects the valves 26 upwardly and thereby permits the gas to pass into the chamber 24, the flexure of the valves being limited by the bridging member 27. In flexing the valves 26 by the passage of compressed gas, the ends of the valves will slide between the plate 13 and the ends of the bridging member 27. As the pressure of the gas opening the valves 26 in this way diminishes, the valves will flatten and seat on the plate 13 in closing, the ends of the valves sliding to their initial position beneath the ends 28 of the bridging member. Should excessive pressure be developed in the cylinders 19 or should a slug of liquid, such as oil, be forced through the ports 23, the increased pressure, during such abnormal operation, will force the valve plate 26 against the bridging member 27, and the valve assembly will then be forced bodily upward against the pressure of the springs 33 and 34 and permit the excess liquid to be discharged, the pins 31 serving as vertical guides to direct the movement of the valves outwardly from the plate 13.

A valve constructed in the manner just described operates in a smooth and effective manner to efficiently control the passage of fluid discharged from the cylinders of the compressor under all operating conditions, the opening of the valve being automatically regulated in accordance with the operating capacity of the compressor. It is thus apparent that I have provided a valve of simple construction which may easily be taken apart for purposes of cleaning and inspection, which automatically adjusts itself to the discharge pressure of the compressor, and which is effective in operation.

While I have described one embodiment of my invention as applied to a discharge valve of a compressor, other modifications will readily be apparent to those skilled in the art, and I do not desire my invention to be limited to the specific embodiment shown and described, and I intend in the appended claim to cover all modifications within the spirit and scope of my invention.

What I claim as new and desire to secure by Letters Patent of the United States, is:

A valve structure including a plate or the like having a port therein, an elongated flexible valve having a recess in each end thereof and seated over said port, a rigid bridging member in normal operation slidably retaining the ends of said valve against said plate and having recesses registering with the recesses in the ends of said valve, said valve and said bridging member being bodily movable outwardly from said plate in response to excessive pressure at said port, and means including pins secured to said plate and entering the recesses in said valve and said bridging member for guiding the bodily outward movement of said valve and of said bridging member with respect to said plate.

CLARK ORR.